United States Patent
Yoshizawa et al.

(10) Patent No.: US 9,591,672 B2
(45) Date of Patent: Mar. 7, 2017

(54) WIRELESS COMMUNICATION DEVICE, WIRELESS COMMUNICATION SYSTEM, WIRELESS COMMUNICATION METHOD, AND BASE STATION

(75) Inventors: Atsushi Yoshizawa, Kanagawa (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 13/696,667

(22) PCT Filed: Jun. 13, 2011

(86) PCT No.: PCT/JP2011/063445
§ 371 (c)(1),
(2), (4) Date: Nov. 7, 2012

(87) PCT Pub. No.: WO2011/162114
PCT Pub. Date: Dec. 29, 2011

(65) Prior Publication Data
US 2013/0053075 A1    Feb. 28, 2013

(30) Foreign Application Priority Data

Jun. 23, 2010   (JP) .................................. 2010-142383

(51) Int. Cl.
*H04B 7/00*      (2006.01)
*H04B 15/00*     (2006.01)
*H04W 74/08*     (2009.01)

(52) U.S. Cl.
CPC .................................. *H04W 74/085* (2013.01)

(58) Field of Classification Search
CPC ....................................................... G06F 7/58
(Continued)

(56) References Cited

U.S. PATENT DOCUMENTS 5,282,211 A * 1/1994 Manlick et al. ............... 714/707
5,386,457 A * 1/1995 Cotsonas ............ H04W 74/085
                                                        455/465
(Continued)

FOREIGN PATENT DOCUMENTS

CN      1215963 A    5/1999
CN    101400145 A    4/2009
(Continued)

OTHER PUBLICATIONS

"3$^{rd}$ Generation Partnership Project; Technical Specification Group Services and System Aspects; Study on Facilitating Machine to Machine Communication in 3GPP Systems; (Release 8)", 3GPP TR 22.868 V8.0.0 (Mar. 2007), 15 pages.
(Continued)

*Primary Examiner* — Tilahun B Gesesse
(74) *Attorney, Agent, or Firm* — Chip Law Group

(57) ABSTRACT

There is provided a wireless communication device including a receiving unit for receiving a wireless signal from a base station; a transmitting unit for transmitting an initial signal for connecting to the base station; a random number generator for generating a random number; and a controller for, after a synchronization process based on the wireless signal received from the base station, controlling a timing when the transmitting unit transmits the initial signal in accordance with a delay time corresponding to the random number generated by the random number generator.

14 Claims, 8 Drawing Sheets

(58) Field of Classification Search
USPC .................... 455/500, 507; 708/250, 255
See application file for complete search history.

(56) References Cited

U.S. PATENT DOCUMENTS

| | | | |
|---|---|---|---|
| 6,075,779 A | 6/2000 | Agarwal et al. | |
| 2003/0069005 A1* | 4/2003 | Casaccia et al. | 455/414 |
| 2004/0230406 A1* | 11/2004 | Yamamoto et al. | 703/2 |
| 2005/0053029 A1* | 3/2005 | Lee | H04W 74/008 370/328 |
| 2006/0251107 A1* | 11/2006 | Geren et al. | 370/462 |
| 2008/0043771 A1* | 2/2008 | Cho | H04W 74/002 370/431 |

FOREIGN PATENT DOCUMENTS

| | | |
|---|---|---|
| JP | 11-55179 A | 2/1999 |
| JP | 2002-261933 A | 9/2002 |
| JP | 2006-129102 A | 5/2006 |
| JP | 2008-48233 A | 2/2008 |
| JP | 2008-048233 A | 2/2008 |
| JP | 2008-60852 A | 3/2008 |
| WO | WO 2009/133599 A1 | 11/2009 |

OTHER PUBLICATIONS

"3$^{rd}$ Generation Partnership Project; Technical Specification Group Services and System Aspects; Service Requirements for Machine-Type Communications (MTC); Stage 1 (Release 10)", 3GPP TS 22.368 V10.0.0 (Mar. 2010), 25 pages.
Office Action issued Nov. 25, 2014 in Japanese Patent Application No. 2010-142383.
Office Action issued May 7, 2014 in Japanese Patent Application No. 2010-142383.
Chinese Office Action issued on Sep. 30, 2015 in patent application No. 201180029243.2.
Extended European Search Report issued on Sep. 18, 2015 in patent application No. 11798000.3.
"Randomisation in Access Stratum"; LG Electronics; 3GPP TSG SA WG2 Meeting #79 TD S2-10263410-14 May 2010, Kyoto, Japan.
3rd Generation Partnership Project; Technical Specification Group Services and System Aspects; System Improvements for Machine-Type Communications; (Release 10); 3GPP TR 23.888V0.4.1 (Jun. 2010).
Office Action received for Chinese Patent Application No. 201180029243.2, mailed on Mar. 28, 2016, 21 pages of office action including 14 pages of English translation.
Office Action for CN Patent Application No. 201180029243.2, issued on Aug. 30, 2016, 7 pages of Office Action and 14 pages of English translation.

* cited by examiner

WIRELESS COMMUNICATION DEVICE, WIRELESS COMMUNICATION SYSTEM, WIRELESS COMMUNICATION METHOD, AND BASE STATION

TECHNICAL FIELD

The present disclosure relates to a wireless communication device, a wireless communication system, a wireless communication method, and a base station.

BACKGROUND ART

At present, the standardization of 4G wireless communication system is being carried out in 3GPP (Third Generation Partnership Project). The 4G makes it possible to use techniques such as a relay or carrier aggregation, thereby improving the maximum communication speed and the quality at cell edges. Further, it also has been studied to improve the coverage by introducing a base station other than eNodeB (macrocell base station), such as HeNodeB (Home eNodeB, femtocell base station, small base station for mobile phone) or RHH (Remote Radio Head).

In such wireless communication system, a user equipment is frame-synchronized with a base station based on a synchronization signal transmitted from the base station, and then an oscillator in the user equipment is synchronized with an oscillator of the base station with a high degree of precision. In order for a base station to simultaneously receive wireless signals transmitted from a plurality of user equipments, each of the user equipments performs an adjustment to the length of time according to the distance between the base station and the user equipment, which is called Timing Advance. Specifically, the Timing Advance is performed in the procedure of random access in which the user equipment transmits a preamble toward a random access window. A Timing Advance value can be obtained from a relationship between an arrival time of the preamble at a base station and the random access window. Further, such a random access is described in Patent Literature 1, Patent Literature 2, and so on.

Incidentally, there has been widespread use of communication network in not only normal terminals which are directly used by a person such as the existing portable telephone or PC (Personal Computer) but also terminals which are not directly used by a person to communicate such as a meter, vending machine or electronic advertisement. Hereinafter, the normal terminals directly used by a person will be referred to as MTC, and the terminals not directly used by a person to communicate will be referred to as MTC terminal. There has been a discussion concerning the MTC in 3GPP. As an application of MTC, a variety of applications such as Metering for collecting information of water systems or power systems, Health for collecting information of health care instruments, or the like have been studied. The MTC terminal is a terminal designed specifically for these applications.

Furthermore, the MTC terminal has characteristics such as Time Controlled, Online Small Data Transmission, for example. For this reason, it may be required that the MTC terminal is connected to a base station periodically such as every half hour or one hour and transmits information to a MTC server through the base station. In this case, it is assumed that the MTC terminal, when connected to a base station, performs the Timing Advance including transmission of application in a similar way to that of the user equipment described above.

CITATION LIST

Patent Literature

Patent Literature 1: JP 2008-60852A
Patent Literature 2: WO 2009/133599

SUMMARY OF INVENTION

Technical Problem

It is, however, expected that the number of MTC terminals to be accommodated in each cell becomes very large. Thus, when each of the plurality of MTC terminals simultaneously transmits a preamble as access request at a specific timing, there are an increased number of cases where the preambles collide with each other in a base station and the connection to the base station fails.

In this regard, it may be considered to secure radio equipments which are able to deal with access requests at a peak period, but an excessive investment in infrastructure will be necessary to secure such radio equipments.

Therefore, the present disclosure provides a novel and improved wireless communication device, wireless communication system, wireless communication method, and base station, capable of distributing the timing of access requests by wireless communication devices such as the MTC terminal.

Solution to Problem

According to an embodiment of the present disclosure, there is provided a wireless communication device including a receiving unit for receiving a wireless signal from a base station, a transmitting unit for transmitting an initial signal for connecting to the base station, a random number generator for generating a random number, and a controller for, after a synchronization process based on the wireless signal received from the base station, controlling a timing when the transmitting unit transmits the initial signal in accordance with a delay time corresponding to the random number generated by the random number generator The wireless signal received by the receiving unit may include random number generating data, and the random number generator may generate the random number by using the random number generating data.

The wireless signal received by the receiving unit may include one or more random number generating data, and each of the pieces of random number generating data is associated with identification information, and the random number generator may generate the random number by using the random number generating data in which the wireless communication device is associated with corresponding identification information.

The wireless signal received by the receiving unit may be a broadcast signal.

The random number generating data may indicate an upper limit of the random number generated by the random number generator.

The random number generating data may indicate a lower limit of the random number generated by the random number generator.

The random number generating data may indicate a lower limit and an upper limit of the random number generated by the random number generator.

The random number generating data may indicate a median and a variance of the random number generated by the random number generator.

The random number generating data may indicate a random number model used by the random number generator to generate the random number.

The random number generating data may be a value specified by a user.

The wireless communication device may perform the synchronization process at a periodic timing in accordance with a command from the base station.

Further, according to an embodiment of the present disclosure, there is provided a wireless communication system including a base station, and a wireless communication device including a receiving unit for receiving a wireless signal from a base station, a transmitting unit for transmitting an initial signal for connecting to the base station, a random number generator for generating a random number, and a controller for, after a synchronization process based on the wireless signal received from the base station, controlling a timing when the transmitting unit transmits the initial signal in accordance with a delay time corresponding to the random number generated by the random number generator.

Further, according to an embodiment of the present disclosure, there is provided a wireless communication method including receiving a wireless signal from a base station, generating a random number, and transmitting, after a synchronization process based on the wireless signal received from the base station, an initial signal for connecting to the base station, in accordance with a delay time corresponding to the random number generated by the random number generator.

Further, according to an embodiment of the present disclosure, there is provided a base station including a transmitting unit for transmitting a wireless signal to a wireless communication device, and a receiving unit for receiving an initial signal transmitted from the wireless communication device in accordance with a delay time corresponding to a random number generated in the wireless communication device, the initial signal being used by the wireless communication device to connect to the base station.

Advantageous Effects of Invention

As described above, according to the present disclosure, it is possible to decentralize the timing of access requests by wireless communication devices such as the MTC terminal.

DESCRIPTION OF EMBODIMENTS

Figure 1:
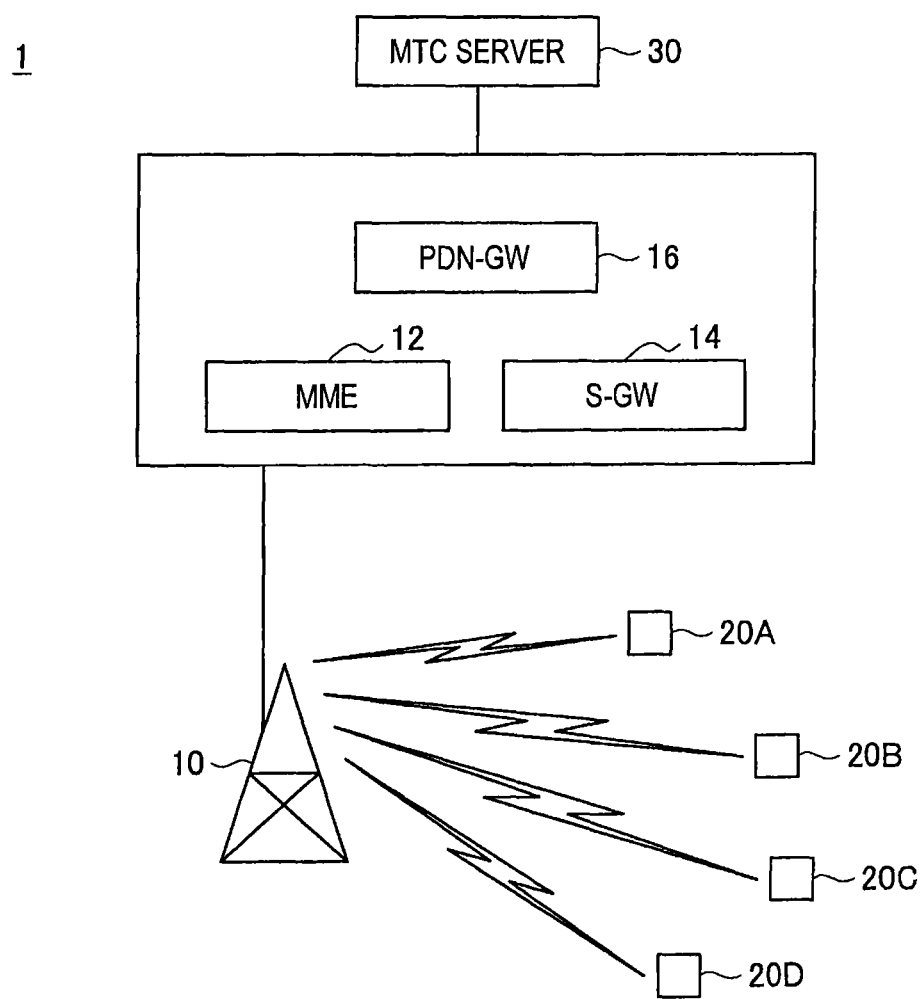
FIG. 1 is an explanatory diagram illustrating an exemplary configuration of a wireless communication system 1.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, in the specification and drawings, a plurality of structural elements having substantially the same functional configuration may be distinguished from each other by each having a different alphabetical letter added to the end of the same reference numeral. For example, a plurality of structural elements having substantially the same functional configuration may be distinguished from each other as necessary, such as MTC terminals 20A, 20B, and 20C. However, if it is not particularly necessary to distinguish each of a plurality of structural elements having substantially the same functional configuration, only the same reference numeral is assigned. For example, if it is not particularly necessary to distinguish between the MTC terminals 20A, 20B, and 20C, they are simply referred to as the MTC terminal 20.

Furthermore, the present disclosure will be described according to the following item order.

1. Overview of Wireless Communication System
   1-1. Configuration of Wireless Communication System
   1-2. Frame Synchronization
   1-3. Timing Advance
   1-4. MTC Terminal
2. First Embodiment
   2-1. Configuration of MTC Terminal
   2-2. Operation of MTC Terminal
3. Second Embodiment
4. Conclusion 1. Overview of Wireless Communication System At present, the standardization of 4G wireless communication system is being carried out in 3GPP. Embodiments of the present disclosure, as an illustrative example, are applicable to the 4G wireless communication system, and thus overview of 4G wireless communication system will be first described.

[1-1. Configuration of Wireless Communication System]

FIG. 1 is an explanatory diagram illustrating an exemplary configuration of a wireless communication system 1. As shown in FIG. 1, the wireless communication system 1 includes an eNodeB 10, a core network, MTC terminals 20, and a MTC server 30. The core network includes a MME (Mobility Management Entity) 12, an S-GW (Serving Gateway) 14, and a PDN (Packet Data Network)-GW 16.

The eNodeB 10 shown in FIG. 1 is an example of a base station, and the MTC terminal 20 is an example of a wireless communication device. As an alternative example, the wireless communication device may be a user equipment (UE: User Equipment). In addition, the base station, for example, may be a relay node which relays communication between the eNodeB 10 and the wireless communication device or a Home eNodeB which is a small base station for home.

The eNodeB 10 is a radio base station that acts as a transmitter for transmitting wireless signals to the MTC terminal 20 and as a receiver for receiving wireless signals from the MTC terminal 20. Note that only one eNodeB 10 is shown in FIG. 1, but in practice a plurality of eNodeBs can be connected to the core network. In addition, although the illustration is omitted from FIG. 1, the eNodeB 10 is also communicated, for example, with user equipments.

The MME 12 is a device that controls the setup, opening and handover of sessions for data communication. The MME 12 is connected to the eNodeB 10 through an interface called X2. The S-GW 14 is a device that performs the routing, transfer, and so on, of user data. The PDN-GW 16 acts as a connection point to IP service network and transfers user data from and to the IP service network.

The MTC terminal 20 is a terminal designed specifically for applications for MTC which has been studied in 3GPP and performs a wireless communication with the eNodeB 10 depending on the applications. In addition, the MTC terminal 20 performs a bidirectional communication with the MTC server 30 through the core network. A user executes a particular application by accessing the MTC server 30. The user normally does not directly access the MTC terminal 20. This MTC terminal 20 will be described in detail in "1-4. MTC Terminal".

[1-2. Frame Synchronization]

It is expected that, though the details are not provided, the eNodeB 10 and the MTC terminal 20 described above will perform the wireless communication in a way similar to the communication between the eNodeB 10 and the user equipment. Therefore, a radio frame which is shared between the eNodeB 10 and the user equipment and the frame synchronization will be described below. The details described below can be incorporated into the communication between the eNodeB 10 and the MTC terminal 20.

Figure 2:
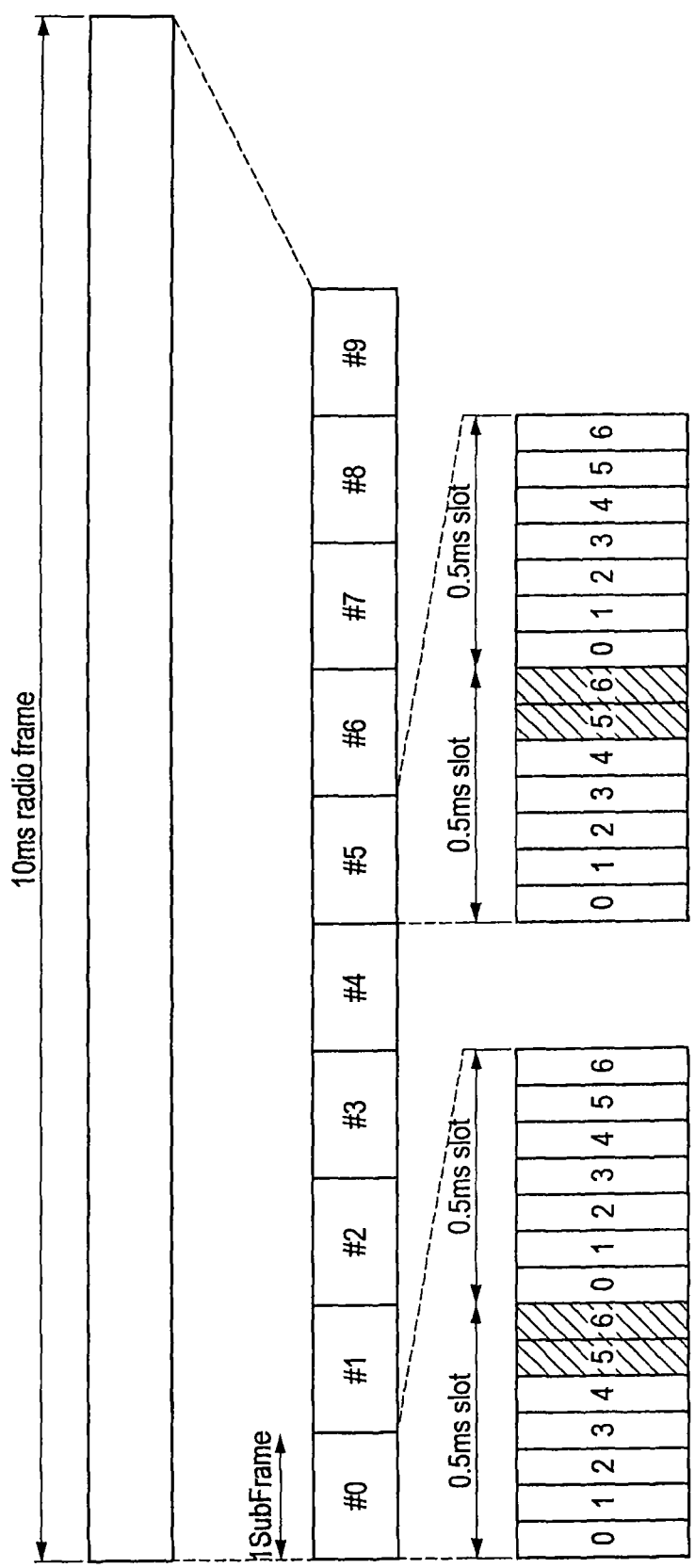
FIG. 2 is an explanatory diagram illustrating a frame format of 4G.

FIG. 2 is an explanatory diagram illustrating a frame format of 4G. As shown in FIG. 2, a radio frame of 10 ms is composed of 10 subframes #0 to #9, each 1 ms long. Each subframe of 1 ms is composed of two slots of 0.5 ms each. In addition, each slot of 0.5 ms is composed of 7 Ofdm symbols.

Further, in the Ofdm symbols drawn with a diagonal line through it as shown in FIG. 2, synchronization signals used for frame synchronization by the user equipment are transmitted. More specifically, a secondary synchronization signal (SSS) is transmitted in the fifth Ofdm symbol of subframe #0, a primary synchronization signal (PSS) is transmitted in the sixth Ofdm symbol of subframe #0, a secondary synchronization signal is transmitted in the fifth Ofdm symbol of subframe #5, and a primary synchronization signal is transmitted in the sixth Ofdm symbol of subframe #5.

The user equipment acquires a period of 5 ms by using the primary synchronization signal, and at the same time, detects a cell number group corresponding to a present location from the cell number groups which are divided into three groups. Subsequently, the user equipment acquires a radio frame period (a period of 10 ms) by using the secondary synchronization signal.

Moreover, a Zadoff-Chu sequence is used for a code sequence of the synchronization signal. Because 168 types of coding sequences are used in the cell number in the cell number group and two types of coding sequences are used to obtain a radio frame period, 336 types of coding sequences are prepared. The user equipment can determine whether a received subframe is the subframe #0 or the subframe #5, based on a combination of the secondary synchronization signal transmitted in the subframe #0 and the secondary synchronization signal transmitted in the subframe #5.

[1-3. Timing Advance]

In order for the eNodeB 10 to simultaneously receive wireless signals transmitted from a plurality of user equipments, 4G user equipment performs an adjustment to the length of time according to the distance between the eNodeB 10 and the user equipment, which is called Timing Advance. Specifically, the Timing Advance is performed in the procedure of random access in which the user equipment transmits a preamble toward a random access window. A Timing Advance value can be obtained from a relationship between an arrival time of the preamble at the eNodeB 10 and the above-mentioned random access window. Further, the random access window is located on a predetermined position in the radio frame, and thus it is arrived periodically.

It is considered that, though the details are not provided, a general MTC terminal also performs the Timing Advance and acquires a Timing Advance value in a similar way to that of the user equipment. Hereinafter, as a comparative example with respect to the embodiment of the present disclosure, there will be a description of the flow of random access which is assumed to be performed by the eNodeB 10 and a general MTC terminal.

Figure 3:
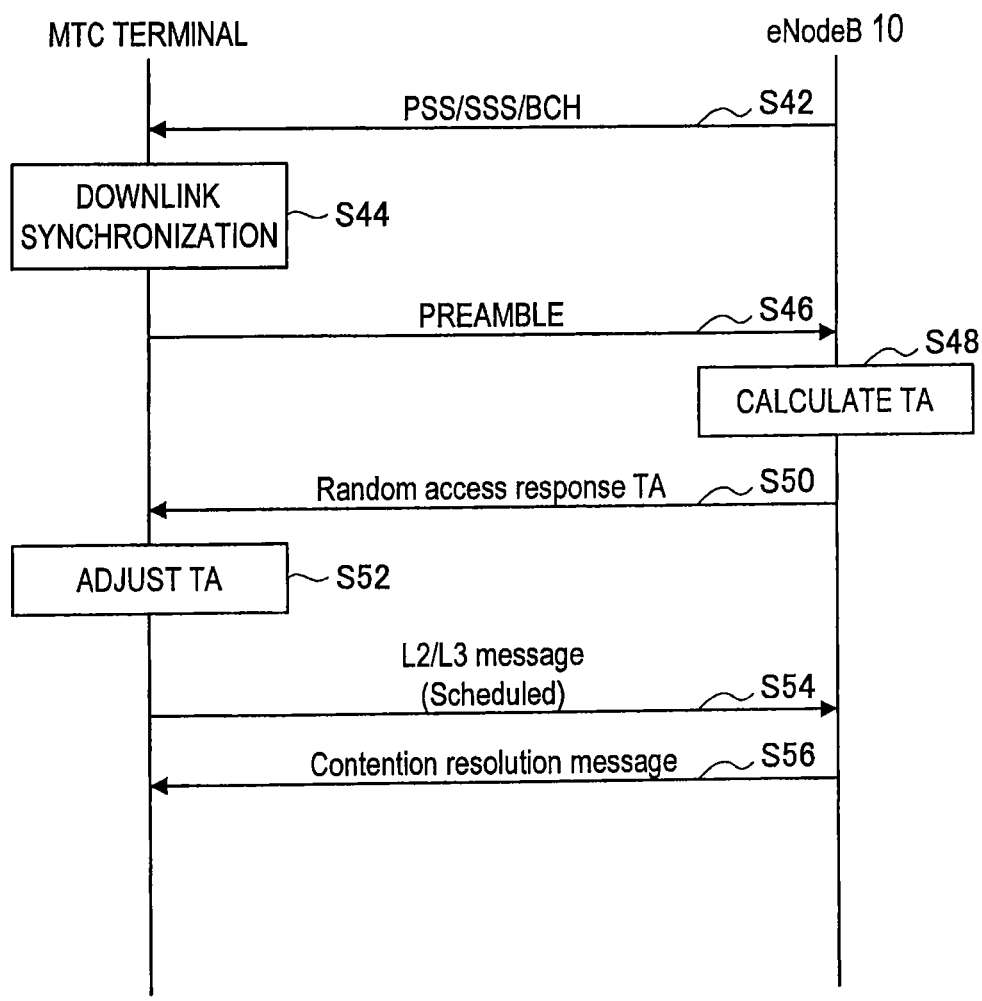
FIG. 3 is a sequence diagram illustrating a comparative example of random access.

FIG. 3 is a sequence diagram illustrating a comparative example of random access. As shown in FIG. 3, when a MTC terminal receives a primary synchronization signal and a secondary synchronization signal from the eNodeB 10 (S42), the MTC terminal performs a downlink frame synchronization (S44), as explained in "1-2. Frame Synchronization".

Subsequently, the MTC terminal transmits a preamble (initial signal for connecting to the eNodeB 10) toward a random access window in the radio frame (S46). Here, the MTC terminal sets PREAMBLE_TRANSMISSION_COUNTER which indicates the number of preamble transmission to 1, sets a backoff parameter value which is a parameter related to the backoff to 0, and then transmits the preamble with an appropriate power. An example of the backoff parameter is indicated in the table below. If the MTC terminal fails to transmit the preamble, the MTC terminal refers to these parameters and retransmits the preamble after the predetermined backoff time has elapsed.

TABLE 1

| Index | Backoff parameter value [ms] |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |

The eNodeB 10 calculates a Timing Advance value from a relationship between an arrival time of the above-mentioned preamble at the eNodeB 10 and the above-mentioned random access window (S48). Then, the eNodeB 10 transmits a random access response to the MTC terminal (S50).

The random access response includes, for example, uplink transmission accept data and the Timing Advance value.

The MTC terminal, when receiving the random access response, adjusts a transmission timing based on the Timing Advance value (S52), and then transmits L2/L3 message (S54). Meanwhile, the eNodeB 10 transmits a contention resolution message to the MTC terminal (S56), this allows the MTC terminal and the eNodeB 10 to be connected to each other.

As described above, the random access in which the transmission of preamble is voluntarily performed by the MTC terminal side is classified as a contention-based type. In this contention-based type, there are some cases where preambles transmitted by a plurality of the MTC terminals are collided with each other. On the other hand, there is also a random access called a contention-free type that a transmission timing of the preamble is previously instructed by the eNodeB 10. The embodiment of the present disclosure is provided with respect to the random access of contention-based type among these random accesses.

[1-4. MTC Terminal]

The MTC terminal 20 is a terminal designed specifically for applications for MTC which has been studied in 3GPP, as described above. Examples of the applications for MTC are as follows:
 1. Security
 2. Trcking & Tracing
 3. Payment
 4. Health
 5. Remote Maintenance/Control
 6. Metering
 7. Consumer Devices As an example, the MTC terminal 20 may be an electrocardiogram measuring device corresponding to "4. Health" in the list above. In this case, if a user inputs a command for requesting the MTC server 30 to report electrocardiogram measurements, the MTC server 30 requests the MTC terminal 20 to report the electrocardiogram measurements, and then the electrocardiogram measurements are reported from the MTC terminal 20 to the MTC server 30.

As another example, the MTC terminal 20 may be a vending machine corresponding to "3. Payment" in the list above. In this case, if a user inputs a command for requesting the MTC server 30 to report the sales volume, the MTC server 30 requests the MTC terminal 20 to report the sales volume, and then the sales volume is reported from the MTC terminal 20 to the MTC server 30.

The characteristics of such MTC terminal 20 are described below. In addition, the MTC terminal 20 is not necessary to have all of the characteristics described below.
 1. Low Mobility
 2. Time Controlled
 3. Time Tolerant
 4. Packet Switched Only
 5. Online Small Data Transmissions
 6. Offline Small Data Transmission
 7. Mobile Originated Only
 8. Infrequent Mobile Terminated
 9. MTC Monitoring
 10. Offline Indication
 11. Jamming Indication
 12. Priority Alarm Message
 13. Extra Low Power Consumption
 14. Secure Connection
 15. Location Specific Trigger
 16. Group based MTC Features Summarizing the above, the MTC terminal 20 has a little movement, has a few connections to the eNodeB 10 to communicate a small amount of data, and then again returns to idle mode. Further, some amount of delay is acceptable in data communication.

(Why and how the Embodiments of the Present Disclosure are Conceived)

Furthermore, there is also considered a case where the MTC terminal 20 is required to periodically transmit information in accordance with "2. Time Controlled" in the list above. However, if each MTC terminal 20 makes an attempt to be connected to the eNodeB 10 periodically, such as every half hour or one hour, problems described below with reference to FIG. 4 will occur.

Figure 4:
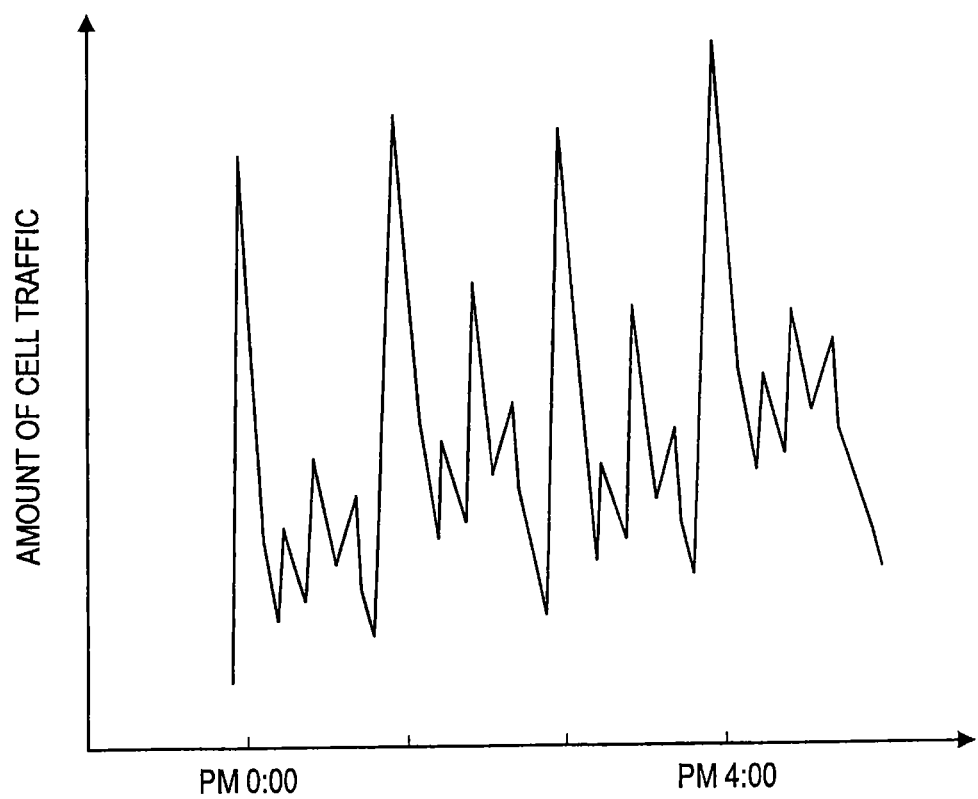
FIG. 4 is an explanatory diagram illustrating a relationship between time and amount of cell traffic.

FIG. 4 is an explanatory diagram illustrating a relationship between time and amount of cell traffic. The number of MTC terminals 20 which can be accommodated in each cell is expected to become very large. Thus, if each MTC terminal 20 makes an attempt to be connected to the eNodeB 10 (random access) and to transmit information at the same timing, as shown in FIG. 4, it is concerned that the amount of cell traffic is increased locally at a specific timing. In addition, even when power is restored from a power outage in a particular region, if the random access is simultaneously performed by each MTC terminal 20, the amount of cell traffic would be increased locally.

In this regard, it may be considered to secure radio equipments which are able to deal with access requests at a peak period, but an excessive investment in infrastructure will be necessary to secure such radio equipments.

Therefore, embodiments of the present disclosure were created with considering the aforementioned circumstances as a solution. According to the embodiments of the present disclosure, it is possible to decentralize the timing of random accesses by the MTC terminals 20. As a result, it is possible to suppress the collision of random accesses in eNodeB 10 and to increase the throughput of the entire system. Hereinafter, the MTC terminal 20 according to the embodiments of the present disclosure will be described in detail.

2. First Embodiment 2-1. Configuration of MTC Terminal

Figure 5:
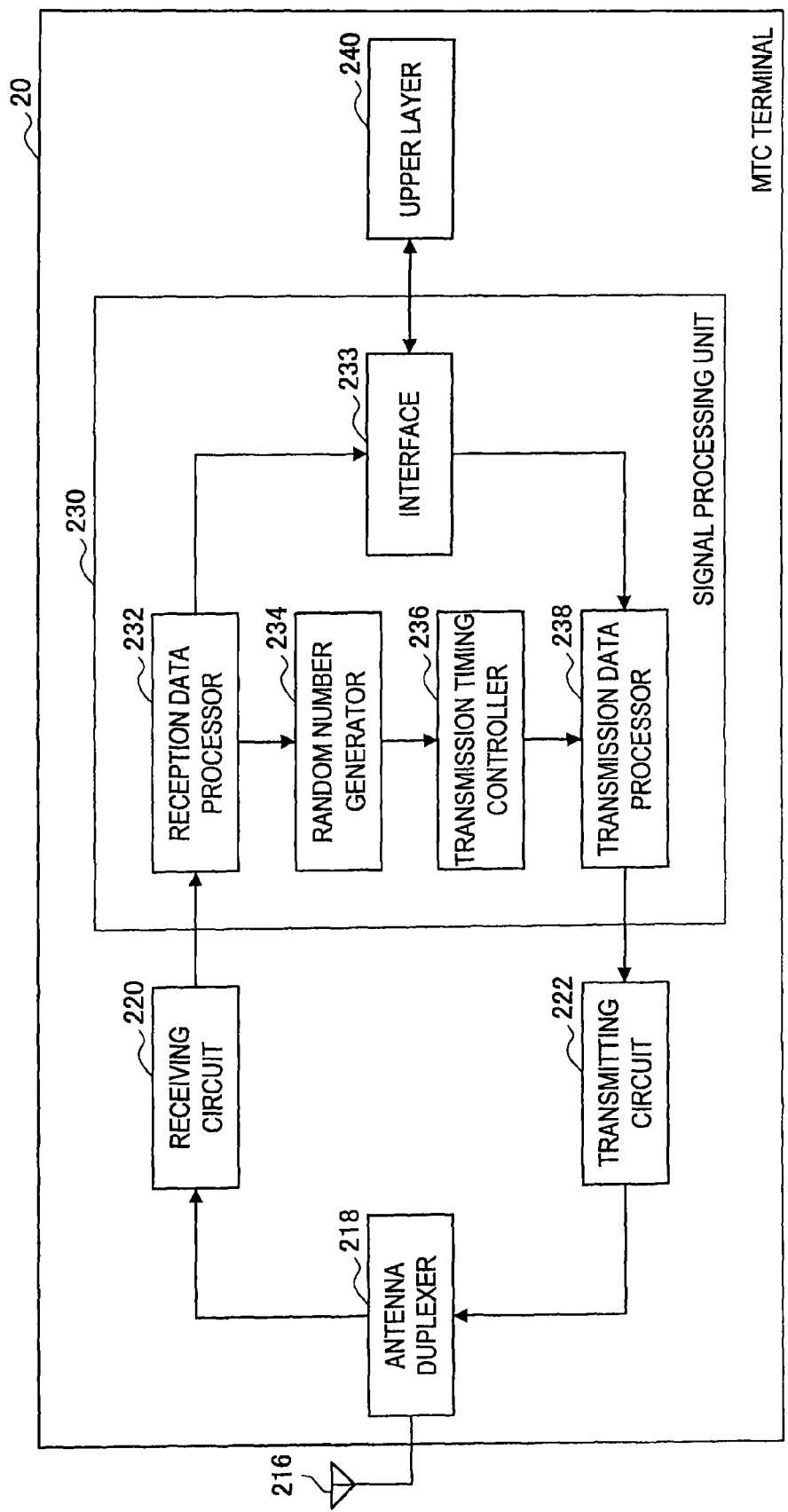
FIG. 5 is a functional block diagram illustrating the configuration of a MTC terminal 20 according to a first embodiment.

Referring to FIG. 5, the configuration of the MTC terminal 20 according to the first embodiment will be first described.

FIG. 5 is a functional block diagram illustrating the configuration of the MTC terminal 20 according to the first embodiment. As shown in FIG. 5, the MTC terminal 20 includes an antenna 216, an antenna duplexer 218, a receiving circuit 220, a transmitting circuit 222, a signal processing unit 230, and an upper layer 240.

The antenna 216 receives a wireless signal from the eNodeB 10 and converts the wireless signal into an electrical reception signal. At the time of the reception, the antenna 216 and the receiving circuit 220 are connected to each other via the antenna duplexer 218, thus the reception signals obtained by the antenna 216 are supplied to the receiving circuit 220.

Moreover, at the time of the transmission, the antenna 216 and the transmitting circuit 222 are connected to each other via the antenna duplexer 218, thus the transmission signal to be transmitted are supplied from the transmission circuit 222 to the antenna 216. The antenna 216 converts the transmission signal into a wireless signal to transmit it to the eNodeB 10.

Further, for convenience of explanation, only one antenna is shown in FIG. 5, but the MTC terminal 20 may include a plurality of antennas. When the MTC terminal 20 includes a plurality of antennas, the MTC terminal 20 can perform MIMO (Multiple Input Multiple Output) communication or diversity communication.

The receiving circuit 220 performs processes such as demodulation and decoding on the reception signal supplied from the antenna 216, and supplies the processed reception data to the signal processing unit 230. In this way, the receiving circuit 220 acts as a receiving unit in cooperation with the antenna 216.

In addition, the receiving circuit 220 performs a synchronization process based on the reception signal. More specifically, when a period or timing is specified by the eNodeB 10, the MTC server 30, or a MTC user, the receiving circuit 220 performs the synchronization process according to the specified period or timing.

The transmitting circuit 222 performs processes such as modulation on the transmission data supplied from the signal processing unit 230, and supplies the processed transmission signal to the antenna 216. In this way, the transmitting circuit 222 acts as a transmitting unit in cooperation with the antenna 216.

The signal processing unit 230 includes a reception data processor 232, an interface 233, a random number generator 234, a transmission timing controller 236, and a transmission data processor 238, as shown in FIG. 5.

The reception data processor 232 analyzes the reception data supplied from the receiving circuit 220, and supplies the reception data for the upper layer to the interface 233. Meanwhile, the reception data processor 232 supplies random number generating data to the random number generator 234, and the random number generating data is used to generate a random number in the random number generator 234. Further, the random number generating data may be included in a broadcast signal (BCH) transmitted from the eNodeB 10.

The interface 233 is an interface that works with the upper layer 240. The reception data is outputted from the interface 233 to the upper layer 240, and the transmission data is inputted from the upper layer 240 to the interface 233.

The upper layer 240 is a function unit for executing an application according to the MTC terminal 20. As described above, an example of the application include "Metering", "Health" and so on. In addition, when the application is the "Metering", data indicating the amount of water or electricity used is assumed as the transmission data. Also, when the application is the "Health", data indicating patient's current physical condition is assumed as the transmission data.

The random number generator 234 generates a random number by using the the random number generating data supplied from the reception data processor 232. There will now be described a specific example of the the random number generating data and a specific example of a method of generating the random number. In addition, the random number generating data may be data which is set by the MTC server 30 or may be data which is set by the MTC user.

Example 1

The random number generating data may be data indicating the upper limit of the random number generated by the random number generator 234. In this case, the random number generator 234 generates the random number within a range that does not exceed the random number generating data.

Example 2

The random number generating data may be data indicating the lower limit of the random number generated by the random number generator 234. In this case, the random number generator 234 generates a random number in a range of not less than the random number generating data.

Example 3

The random number generating data may be data indicating the lower limit and upper limit of the random number generated by the random number generator 234. In this case, the random number generator 234 generates a random number within a range between the lower limit and the upper limit indicated by the random number generating data.

Example 4

The random number generating data may be data indicating a median and a variance of the random number generated by the random number generator 234. In this case, the random number generator 234 generates the random number according to the median and the variance indicated by the random number generating data.

Example 5

The random number generating data may be data indicating a random number model used for the random number generator 234 to generate a random number. In this case, the random number generator 234 generates the random number according to the random number model indicated by the random number generating data. In addition, as the random number model, a variety of random number models such as a random number model of normal distribution or uniform distribution are considered.

Example 6

The random number generating data may also be data indicating an initial random number used for the random number generator 234 to generate a random number. In this case, the random number generator 234 generates the random number by using the initial data indicated by the random number generating data.

The transmission timing controller 236 (a control unit) controls a transmission timing of preamble in accordance with a delay time corresponding to a random number generated by the random number generator 234. For example, the delay time may be set so that the time becomes longer as the random number generated by the random number generator 234 is large. The transmission timing controller 236 controls the transmission timing of preamble in accordance with the delay time after the receiving circuit 220 performs the synchronization process. More specifically, the transmission timing controller 236 may control so that a preamble in the random access window in the vicinity of the time when the delay time has elapsed will be transmitted, after the receiving circuit 220 performs the synchronization process.

The transmission data processor 238, at the time of the random access, supplies the preamble to the transmitting circuit 222 at the timing controlled by the transmission timing controller 236. As a result, the preamble is transmitted from the antenna 216 at the timing controlled by the transmission timing controller 236. In addition, the transmission data processor 238, at the time of the data transmission, generates transmission data including data supplied from the interface 233 and supplies the transmission data to the transmitting circuit 222.

As described above, in the MTC terminal 20 according to the embodiment of the present disclosure, after the receiving circuit 220 periodically performs a synchronization process for the random access, the preamble is transmitted in accordance with the delay time corresponding to a random number generated by the random number generator 234. Thus, even if a plurality of MTC terminals 20 are set to initiate random accesses at the same timing, it is possible to decentralize the transmission timing of preambles by the plurality of MTC terminals 20. As a result, it is possible to suppress the collision of random accesses in the eNodeB 10 and to increase the throughput of the entire system.

2-2. Operation of MTC Terminal

As described above, the configuration of the MTC terminal 20 according to the embodiment of the present disclosure has been described with reference to FIG. 5. Subsequently, the operation of the MTC terminal 20 will be described with reference to FIG. 6 and FIG. 7.

Figure 6:
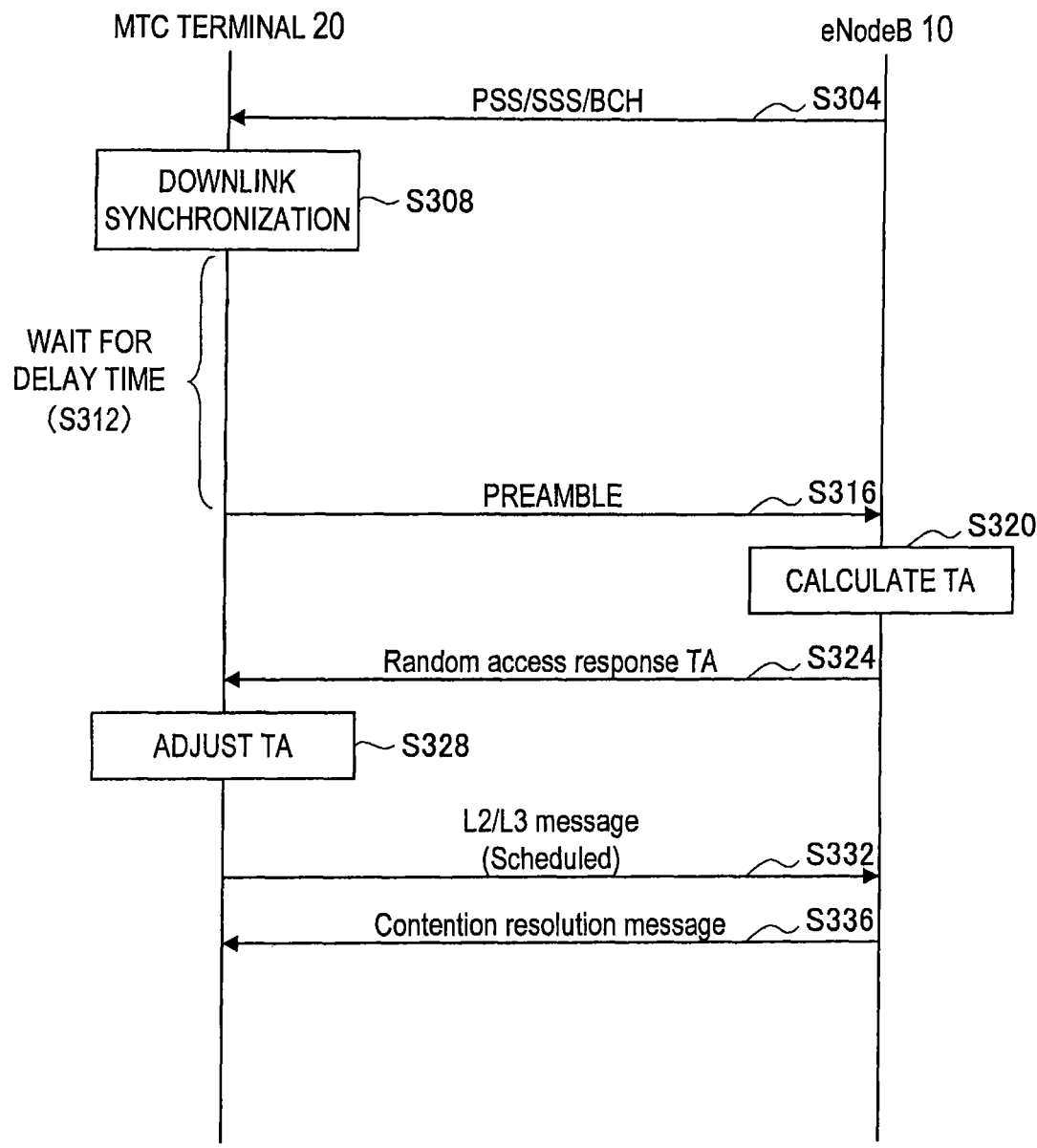
FIG. 6 is a sequence diagram illustrating operations of the MTC terminal 20 and an eNodeB 10.

FIG. 6 is a sequence diagram illustrating operations of the MTC terminal 20 and the eNodeB 10. As shown in FIG. 6, the MTC terminal 20, when it receives the primary synchronization signal and the secondary synchronization signal from the eNodeB 10 (S304), performs a downlink frame synchronization (S308), as described in "1-2. Frame Synchronization".

Furthermore, the MTC terminal 20 receives a BCH (a reporting channel) in S304, thereby obtaining a variety of data. Examples of the variety of data include a RA-RNTIs (Random access radio network temporary identifiers) which is a temporary ID, a TTI window value related to the time for the MTC terminal 20 to monitor the response from the eNodeB 10, data relate to the control for the transmission power of preamble, random number generating data, and so on.

If the random number generator 234 of the MTC terminal 20 generates a random number by using the above-mentioned random number generating data, the transmission timing controller 236 waits for the MTC terminal 20 to transmit the preamble during the delay time corresponding to the generated random number (S312). And then, the transmission timing controller 236, in the random access window after the delay time has elapsed, controls the transmission data processor 238 to cause the MTC terminal 20 to transmit the preamble (S316).

The eNodeB 10 calculates a Timing Advance value from the relationship between an arrival time of the above-mentioned preamble at the eNodeB 10 and the above-mentioned random access window (S320).

Next, the eNodeB 10 transmits a random access response to the MTC terminal 20 (S324). This random access response, for example, includes uplink transmission accept data, BI (Backoff Indicator) indicating the backoff parameter value shown in the table above, and a Timing Advance value.

The MTC terminal 20, when it receives the random access response, adjusts the transmission timing based on the Timing Advance value (S328), and then transmits L2/L3 message (S332). Meanwhile, the eNodeB 10 transmit a contention resolution message to the MTC terminal (S336), and thereby the eNodeB 10 is connected to the MTC terminal 20.

Figure 7:
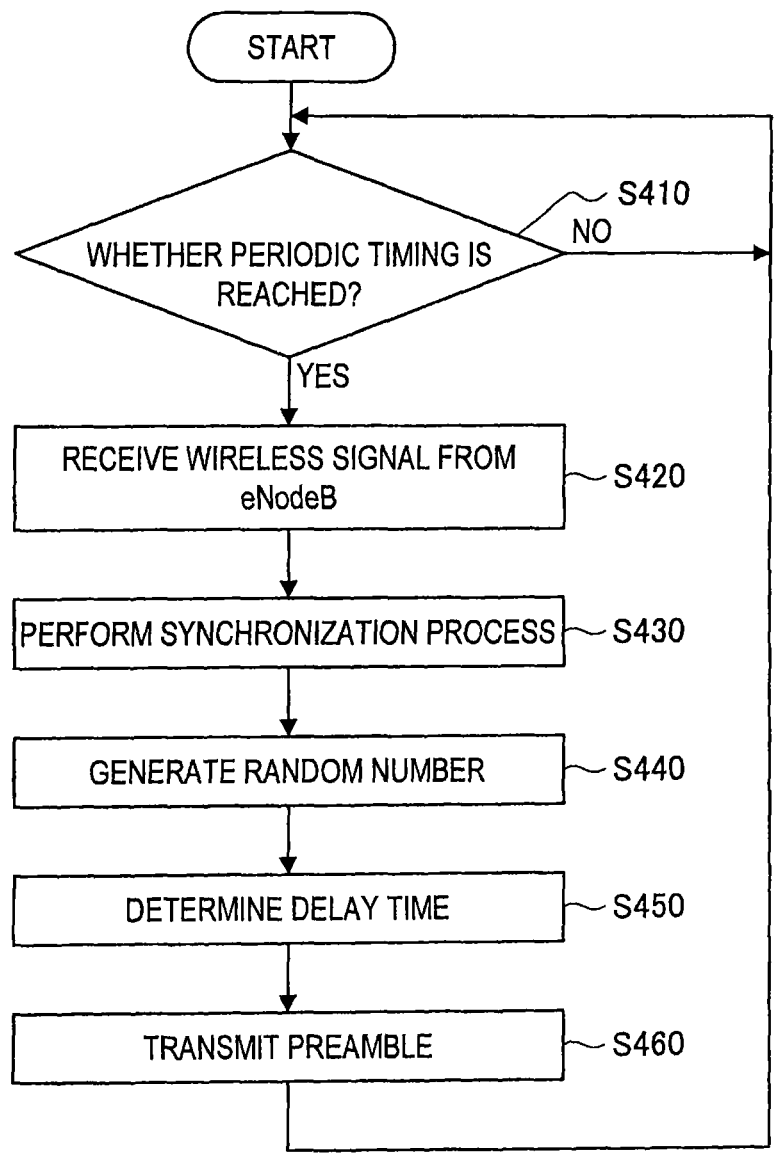
FIG. 7 is a flowchart illustrating an operation of the MTC terminal 20.

FIG. 7 is a flowchart illustrating the operation of the MTC terminal 20. When a given period is specified by the MTC server 30, MTC user, or the like, as shown in FIG. 7, the MTC terminal 20 determines whether the timing according to the specified given period is reached or not (S410). Next, when it is determined that the timing according to the given period is reached, the MTC terminal 20 receives a wireless signal from the eNodeB 10 (S420), and the receiving circuit 220 performs the synchronization process (S430).

Next, the random number generator 234 generates a random number by using the random number generating data included in the reception signal from the eNodeB 10 (S440). In addition, the transmission timing controller 236 determines the delay time corresponding to the random number generated by the random number generator 234 (S450). Then, the transmission timing controller 236, in the random access window after the delay time has elapsed, controls the transmission data processor 238 so that the MTC terminal 20 transmits the preamble (S460).

3. Second Embodiment

As described above, the first embodiment of the present disclosure has been described. In the first embodiment, there has been explained the case where the random number generator 234 generates a random number by using the random number generating data included in the reception signal. However, because a wide variety of applications can be installed in the MTC terminal 20, it is assumed a case where an acceptable delay time or desired delay time is varied depending on the MTC terminal 20. For example, when an application for transmitting data that indicates the amount of water or electricity used is installed in the MTC terminal 20 and an application for transmitting data that indicates patient's current physical condition is installed in the MTC terminal 20, it is considered that the respective acceptable delay times are different from each other. The second embodiment of the present disclosure described below is provided in view of this point.

The eNodeB 10 according to the second embodiment, for example in the BCH, associates one or more pieces of random number generating data with a group ID (identification information) and transmits the associated data. An exemplary configuration of the BCH will be described below with reference to FIG. 8.

Figure 8:
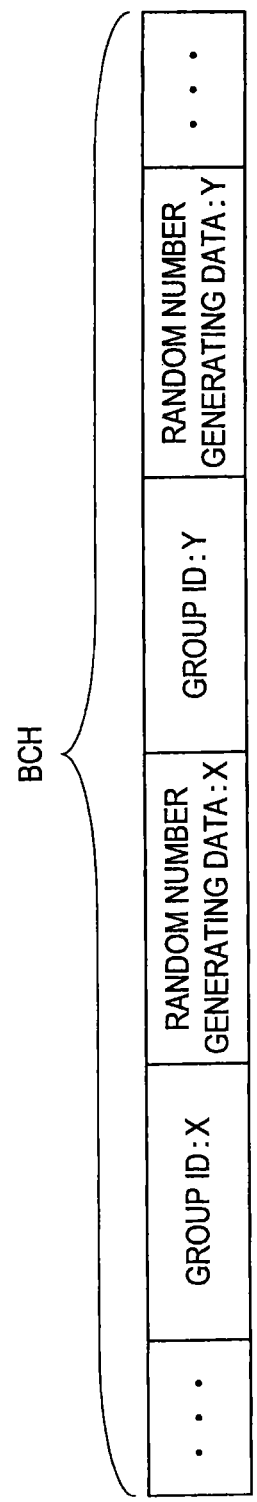
FIG. 8 is an explanatory diagram illustrating an exemplary configuration of BCH according to a second embodiment.

FIG. 8 is an explanatory diagram illustrating an exemplary configuration of the BCH according to the second embodiment. As shown in FIG. 8, the BCH includes a group ID and random number generating data. In addition, the group ID and the random number generating data are associated in a one-to-one manner. For example, the random number generating data: X is associated with the group ID: X, and the random number generating data: Y is associated with the group ID: Y.

Moreover, the group ID is identification information that indicates a group of the MTC terminal 20. This group of the MTC terminal 20, for example, may be formed for each application installed in the MTC terminal 20. In another example, the MTC terminals 20 may be grouped by the eNodeB 10, the MTC server 30 or the MTC user, and the group ID may be previously notified from the eNodeB 10, the MTC server 30 or the MTC user to the MTC terminal 20.

When the MTC terminal 20 receives such BCH, the reception data processor 232 extracts random number generating data in which the MTC terminal 20 is associated with the group ID among the random number generating data included in the BCH. And then, the random number generator 234 generates a random number by using the random number generating data extracted by the reception data processor 232. According to this configuration, it is possible to control the delay characteristics related to the preamble transmission by the MTC terminal 20 in accordance with the group to which the MTC terminal 20 belongs.

4. Conclusion

As described above, in the MTC terminal 20 according to the embodiments of the present disclosure, after the receiving circuit 220 periodically performs the synchronization process for the random access, the preamble is transmitted in accordance with the delay time corresponding to the random number generated by the random number generator 234. Thus, even if a plurality of MTC terminals 20 are set to initiate random accesses at the same timing, it is possible to decentralize the transmission timing of preambles by the plurality of MTC terminals 20. As a result, it is possible to suppress the collision of random accesses in the eNodeB 10 and to increase the throughput of the entire system. In addition, according to the second embodiment of the present disclosure, it is possible to control the delay characteristics related to the preamble transmission by the MTC terminal 20 in accordance with the group to which the MTC terminal 20 belongs.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

For example, each step in the process of the MTC terminal 20 of the present specification do not necessarily have to be processed in a time series according to the order described as the sequence diagrams or flowcharts. For example, each step in the process of the MTC terminal 2 may be processed in an order different from the order described as flowcharts, or may be processed in parallel.

Furthermore, a computer program for causing hardware such as CPU, ROM and RAM, embedded in the MTC terminal 2 to realize an equivalent function as each element of the above-mentioned MTC terminal 2 can also be created. Moreover, a storage medium having the computer program stored thereon is also provided.

REFERENCE SIGNS LIST 10 eNodeB
12 MME
14 S-GW
16 PDN-GW
20 MTC terminal
30 MTC server
216 Antenna
220 Receiving circuit
222 Transmitting circuit
230 Signal processing unit
232 Reception data processor
233 Interface
234 Random number generator
236 Transmission timing controller
238 Transmission data processor
240 Upper layer

The invention claimed is:

1. A wireless communication device, comprising:
a receiving unit configured to receive a wireless signal from a base station;
a transmitting unit configured to transmit an initial signal to connect to the base station;
a random number generator configured to generate a random number using random number generating data included in the wireless signal received from the base station,
wherein the random number generating data indicates an initial random number to be used by the random number generator to generate the random number; and
a controller configured to, after a synchronization process based on the wireless signal received from the base station, control a timing in an event the transmitting unit transmits the initial signal in accordance with a delay time set that corresponds to the random number generated by the random number generator.

2. The wireless communication device according to claim 1,
wherein the wireless signal received by the receiving unit includes one or more pieces of the random number generating data, and each of the one or more pieces of the random number generating data is associated with identification information, and
wherein the random number generator is configured to generate the random number by using the piece of random number generating data in which the wireless communication device is associated with corresponding identification information.

3. The wireless communication device according to claim 1, wherein the wireless signal received by the receiving unit is a broadcast signal.

4. The wireless communication device according to claim 1, wherein the random number generating data indicates an upper limit of the random number to be generated by the random number generator.

5. The wireless communication device according to claim 1, wherein the random number generating data indicates a lower limit of the random number to be generated by the random number generator.

6. The wireless communication device according to claim 1, wherein the random number generating data indicates a lower limit and an upper limit of the random number to be generated by the random number generator.

7. The wireless communication device according to claim 1, wherein the random number generating data indicates a median and a variance of the random number to be generated by the random number generator.

8. The wireless communication device according to claim 1, wherein the random number generating data indicates a random number model to be used by the random number generator to generate the random number.

9. The wireless communication device according to claim 1, wherein the random number generating data is a value specified by a user.

10. The wireless communication device according to claim 1, wherein the wireless communication device is configured to perform the synchronization process at a periodic timing in accordance with a command from the base station.

11. A wireless communication system, comprising:
a base station; and
a wireless communication device including:
a receiving unit configured to receive a wireless signal from the base station;
a transmitting unit configured to transmit an initial signal to connect to the base station;

a random number generator configured to generate a random number using random number generating data included in the wireless signal received from the base station, wherein the random number generating data indicates an initial random number to be used by the random number generator to generate the random number; and a controller configured to, after a synchronization process based on the wireless signal received from the base station, control a timing in an event the transmitting unit transmits the initial signal in accordance with a delay time set that corresponds to the random number generated by the random number generator.

12. A wireless communication method, comprising:

receiving a wireless signal from a base station;

generating a random number using random number generating data included in the wireless signal received from the base station, wherein the random number generating data indicates an initial random number to be used to generate the random number; and transmitting, after a synchronization process based on the wireless signal received from the base station, an initial signal for connecting to the base station, in accordance with a delay time set corresponding to the generated random number.

13. A base station, comprising:

a transmitting unit configured to transmit a wireless signal to a wireless communication device; and a receiving unit configured to receive an initial signal transmitted from the wireless communication device in accordance with a delay time set according to a a random number generated, in the wireless communication device, using random number generating data included in the wireless signal transmitted from the base station, wherein the initial signal is used by the wireless communication device to connect to the base station, wherein the random number generating data indicates an initial random number to be used by the wireless communication device to generate the random number.

14. A wireless communication device, comprising:

a receiving unit configured to receive a wireless signal from a base station;

a transmitting unit configured to transmit an initial signal to connect to the base station;

a random number generator configured to generate a random number using random number generating data included in the wireless signal received from the base station; and a controller configured to, after a synchronization process based on the wireless signal received from the base station, control a timing in an event the transmitting unit transmits the initial signal in accordance with a delay time set that corresponds to the random number generated by the random number generator, wherein the random number generating data indicates a median and a variance of the random number to be generated by the random number generator.

* * * * *